(12) United States Patent
Matsumoto et al.

(10) Patent No.: US 11,370,276 B2
(45) Date of Patent: Jun. 28, 2022

(54) AIR PURIFICATION DEVICE

(71) Applicant: HONDA MOTOR CO., LTD., Tokyo (JP)

(72) Inventors: Subaru Matsumoto, Wako (JP); Shinji Kakizaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 286 days.

(21) Appl. No.: 16/665,036

(22) Filed: Oct. 28, 2019

(65) Prior Publication Data
US 2020/0171925 A1 Jun. 4, 2020

(30) Foreign Application Priority Data
Nov. 30, 2018 (JP) .............................. JP2018-225473

(51) Int. Cl.
*B01D 53/04* (2006.01)
*B60H 3/06* (2006.01)

(52) U.S. Cl.
CPC ....... *B60H 3/0633* (2013.01); *B01D 53/0446* (2013.01); *B60H 3/0641* (2013.01);
(Continued)

(58) Field of Classification Search
CPC ............ B01D 53/0407; B01D 53/0446; B01D 2257/80; B01D 2257/504; B01D 2258/80;
(Continued)

(56) References Cited

U.S. PATENT DOCUMENTS 2,709,496 A * 5/1955 Baker ...................... B62D 5/06
96/113
4,364,753 A * 12/1982 Wagner .............. B01D 53/0446
96/130
(Continued)

FOREIGN PATENT DOCUMENTS

DE 000019955253 6/2001
JP 02-021921 1/1990
(Continued)

OTHER PUBLICATIONS

Japanese Office Action for Japanese Patent Application No. 2018-225473 dated Oct. 5, 2021.
(Continued)

*Primary Examiner* — Frank M Lawrence, Jr.
(74) *Attorney, Agent, or Firm* — Amin, Turocy & Watson, LLP (57) ABSTRACT

An air purification device includes an adsorption block, a housing, an introduction port for indoor air, an introduction port for heated air, a return port for indoor air, and a discharge port for used regeneration air. The adsorption block adsorbs purification target substances in indoor air, and is regenerated by dispersing the adsorbed purification target substances by circulating heated air. The housing accommodates the adsorption block therein. The introduction port for indoor air and the introduction port for heated air are provided on one end side of the housing. The return port for indoor air and the discharge port for used regeneration air are provided on the other end side of the housing. An insulating layer is provided between the housing and an outer surface of the adsorption block.

4 Claims, 5 Drawing Sheets

(52) U.S. Cl.
CPC .............. *B01D 2259/402* (2013.01); *B01D 2259/40086* (2013.01); *B01D 2259/4566* (2013.01); *B60H 2003/0691* (2013.01)

(58) Field of Classification Search
CPC .... B01D 2259/40086; B01D 2259/402; B01D 2259/4566; B60H 3/0085; B60H 3/0633; B60H 3/0641; B60H 2003/0691; Y02C 20/40
USPC .......................... 96/121, 126, 143, 146, 152
See application file for complete search history.

(56) References Cited

U.S. PATENT DOCUMENTS

| | | | | |
|---|---|---|---|---|
| 5,620,367 A | * | 4/1997 | Khelifa | ............... B01D 53/261 454/156 |
| 5,908,492 A | * | 6/1999 | Lehman | ............... B01J 8/02 96/126 |
| 5,938,523 A | * | 8/1999 | Khelifa | ............... B60H 3/0633 454/156 |
| 6,896,852 B1 | * | 5/2005 | Meiller | ............... B01D 53/0415 123/519 |
| 2008/0302246 A1 | * | 12/2008 | Carruthers | ............... B01J 20/20 96/154 |
| 2009/0223370 A1 | * | 9/2009 | Kosugi | ............... F02M 25/0854 96/126 |

FOREIGN PATENT DOCUMENTS

| | | |
|---|---|---|
| JP | 04-277004 | 10/1992 |
| JP | 08-266850 | 10/1996 |
| JP | 2005-030613 | 2/2005 |
| JP | 2005-255006 | 9/2005 |

OTHER PUBLICATIONS

Japanese Office Action for Japanese Patent Application No. 2018-225473 dated Apr. 5, 2022.

* cited by examiner

AIR PURIFICATION DEVICE

CROSS-REFERENCE TO RELATED APPLICATION

Priority is claimed on Japanese Patent Application No. 2018-225473, filed Nov. 30, 2018, the content of which is incorporated herein by reference.

BACKGROUND OF THE INVENTION

Field of the Invention

The present invention relates to an air purification device configured to adsorb purification target substances indoors and purify indoor air.

Description of Related Art

As an air purification device used in a vehicle or the like, a device configured to adsorb purification target substances in the interior using an adsorption block that supports an adsorbent such as activated carbon or the like is known. The air purification device is configured to take the air in the interior into a casing, and return purified air after the purification target substances in the air have been adsorbed by the adsorption block to the interior.

In the adsorption block disposed in the casing, the concentration of the purification target substances adsorbed increases as time elapses, and an adsorption capacity gradually decreases. As a countermeasure for this, an air purification device configured to cause heated air to flow to the adsorption block, disperse the purification target substances adsorbed by the adsorption block using heat therefrom, and regenerate the adsorption block when an adsorption capacity of the adsorption block has decreased is known (for example, see Japanese Unexamined Patent Application, First Publication No. 2005-255006)).

SUMMARY OF THE INVENTION

However, since the air purification device disclosed in Japanese Unexamined Patent Application, First Publication No. 2005-255006 is fixed in a state in which the adsorption block comes into surface contact with an inner surface of a housing, when heated air flows into the adsorption block during regeneration of the adsorption block, heat from the adsorption block easily escapes outside through the housing. For this reason, when the output of the device configured to heat air is not increased, it is difficult to sufficiently disperse the purification target substances from the adsorption block.

An aspect of the present invention is directed to providing an air purification device capable of efficiently dispersing purification target substances from an adsorption block during regeneration of the adsorption block.

(1) An air purification device according to an aspect of the present invention includes an adsorption block configured to adsorb purification target substances in air by indoor air being circulated, and which is regenerated by dispersing the absorbed purification target substances by circulating heated air; a housing configured to accommodate the adsorption block therein; an introduction port for indoor air and an introduction port for heated air provided on one end side of the housing; and a return port for indoor air and a discharge port for used regeneration air provided on the other end side of the housing, wherein the air purification device being switchable between an air purification state in which the introduction port for indoor air and the return port for indoor air are able to communicate with the adsorption block and a regeneration state in which the introduction port for heated air and the discharge port for used regeneration air are able to communicate with the adsorption block, and an insulating layer is provided between the housing and the outer surface of the adsorption block.

In the configuration of the above-mentioned (1), when the adsorption block is regenerated, the adsorption block is made to a state in communication with the introduction port for heated air and the discharge port for used regeneration air. In this state, when the heated air is circulated in the adsorption block, purification target substances adsorbed on the adsorption block receive heat from the heated air and are dispersed in the air. The air with which the purification target substances are mixed is discharged to the outside through the discharge port for the used regeneration air.

When the heated air is circulated in the adsorption block, no radiation of heat from the adsorption block to the outside is advantageous for dispersing the purification target substances.

In the air purification device of the aspect of the present invention, since the insulating layer is provided between the housing and the outer surface of the adsorption block, heat transfer from the adsorption block to the housing is minimized.

(2) In the aspect of the above-mentioned (1), the housing may include a partition wall configured to partition the inside thereof into a plurality of accommodating chambers, an adsorption block may be disposed in each of the accommodating chambers, and the adsorption blocks in each of the accommodating chambers may be made switchable between the air purification state and the regeneration state.

In this case, since the insulating layer is also interposed between the adsorption block and the partition wall, transfer of heat from the adsorption block to another adsorption block through the partition wall can be minimized.

(3) In the aspect of the above-mentioned (1) or (2), the insulating layer may be constituted by a hollow chamber provided to seal between the housing and the adsorption block.

In this case, excellent insulating properties can be obtained by the hollow chamber, and smooth expansion of the outer surface of the adsorption block due to heat can be allowed by the hollow chamber. Accordingly, application of an unnecessary external force to surroundings due to thermal expansion of the outer surface of the adsorption block can be minimized.

(4) In the aspect of the above-mentioned (3), a space between a circumferential edge of an air introduction-side end portion of the adsorption block and the housing may be sealed by a first seal section, and a space between a circumferential edge of an air discharge-side end portion the adsorption block and the housing may be sealed by a second seal section.

In this case, the hollow chamber can be constituted using a simple configuration.

(5) In the aspect of the above-mentioned (4), a support protrusion disposed between the first seal section and the second seal section and in contact with the outer surface of the adsorption block may be provided on the inner surface of the housing.

In this case, displacement of the adsorption block can be restricted by the support protrusion while reducing thermal conduction from the adsorption block to the housing to a minimum level.

(6) In the aspect of the above-mentioned (5), a tip of the support protrusion may be formed in a hemi-spherical shape.

In this case, sufficient support rigidity with respect to the adsorption block can be secured by the support protrusion having a hemi-spherical tip, and thermal conduction from the adsorption block to the housing through the support protrusion can be reduced.

In the aspect of the present invention, since the insulating layer is provided between the housing and the outer surface of the adsorption block, during regeneration of the adsorption block, heat transfer from the adsorption block to the housing is minimized, and heat radiation from adsorption block to the outside becomes difficult. Accordingly, according to the aspect of the present invention, during regeneration of the adsorption block, the purification target substances can be efficiently dispersed from the adsorption block.

DETAILED DESCRIPTION OF THE INVENTION

Hereinafter, embodiments of the present invention will be described with reference to the accompanying drawings.

Figure 1:
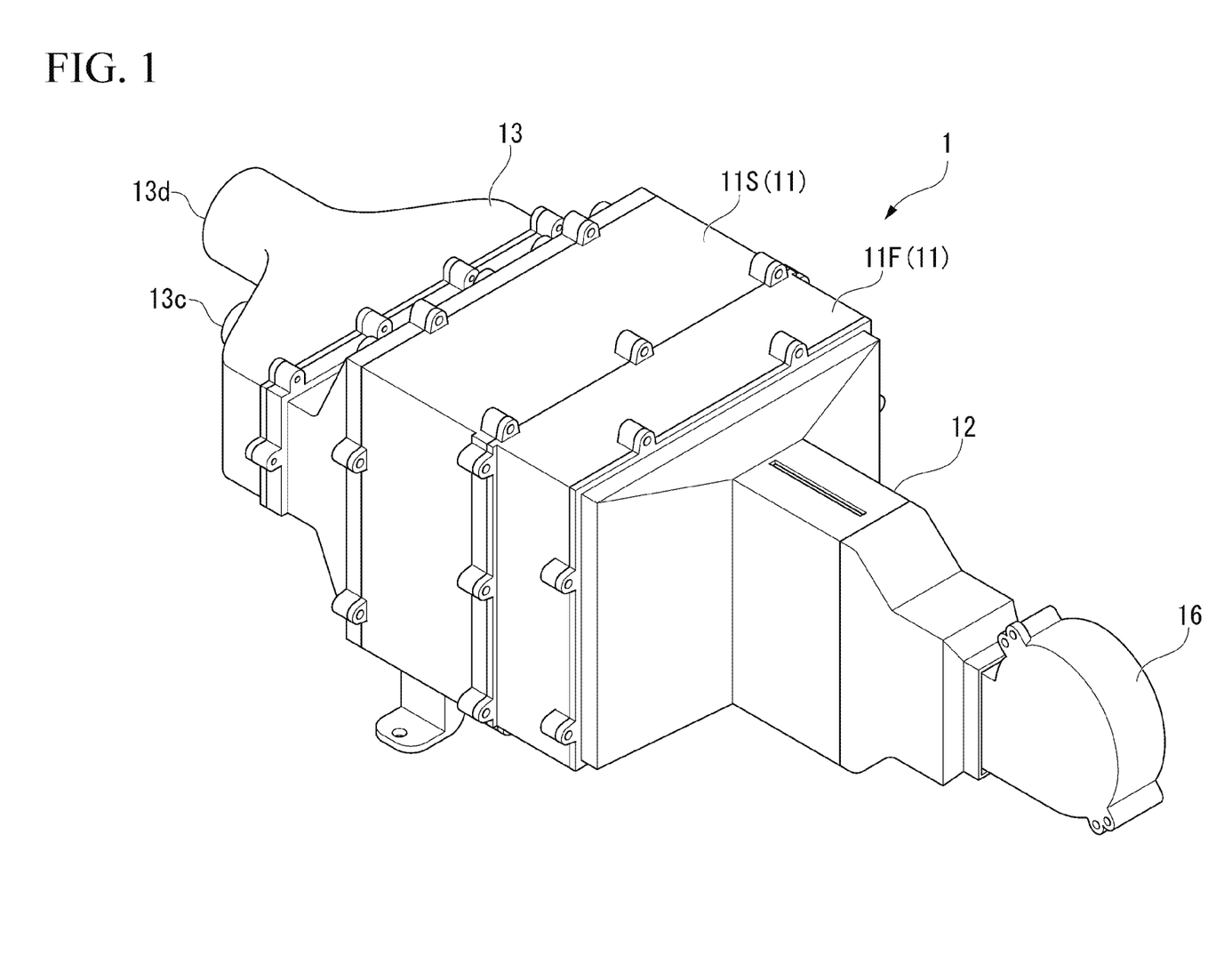
FIG. 1 is a perspective view of an air purification device of an embodiment of the present invention.
Figure 2:
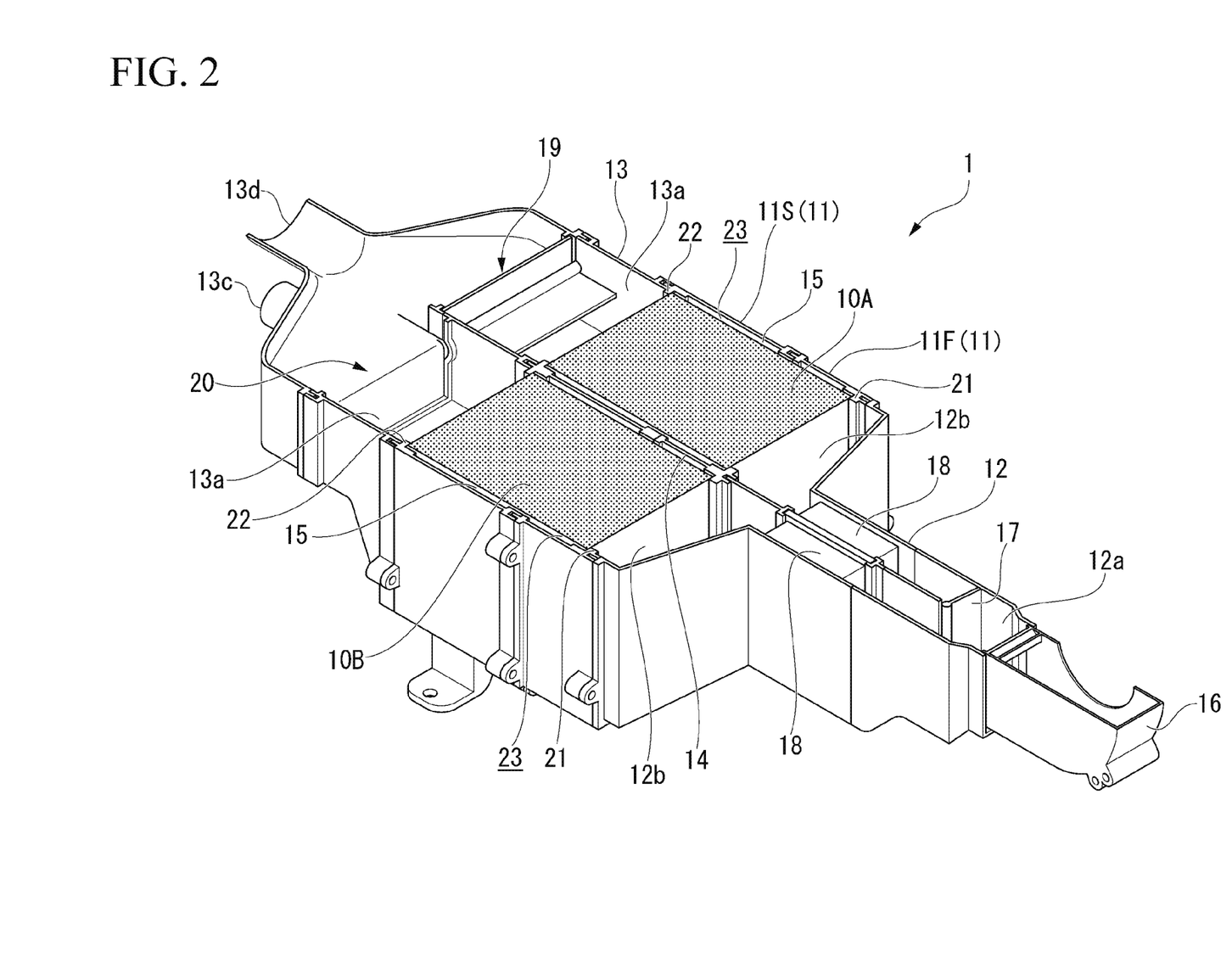
FIG. 2 is a partially cutout perspective view of the air purification device of the embodiment of the present invention.
Figure 3:
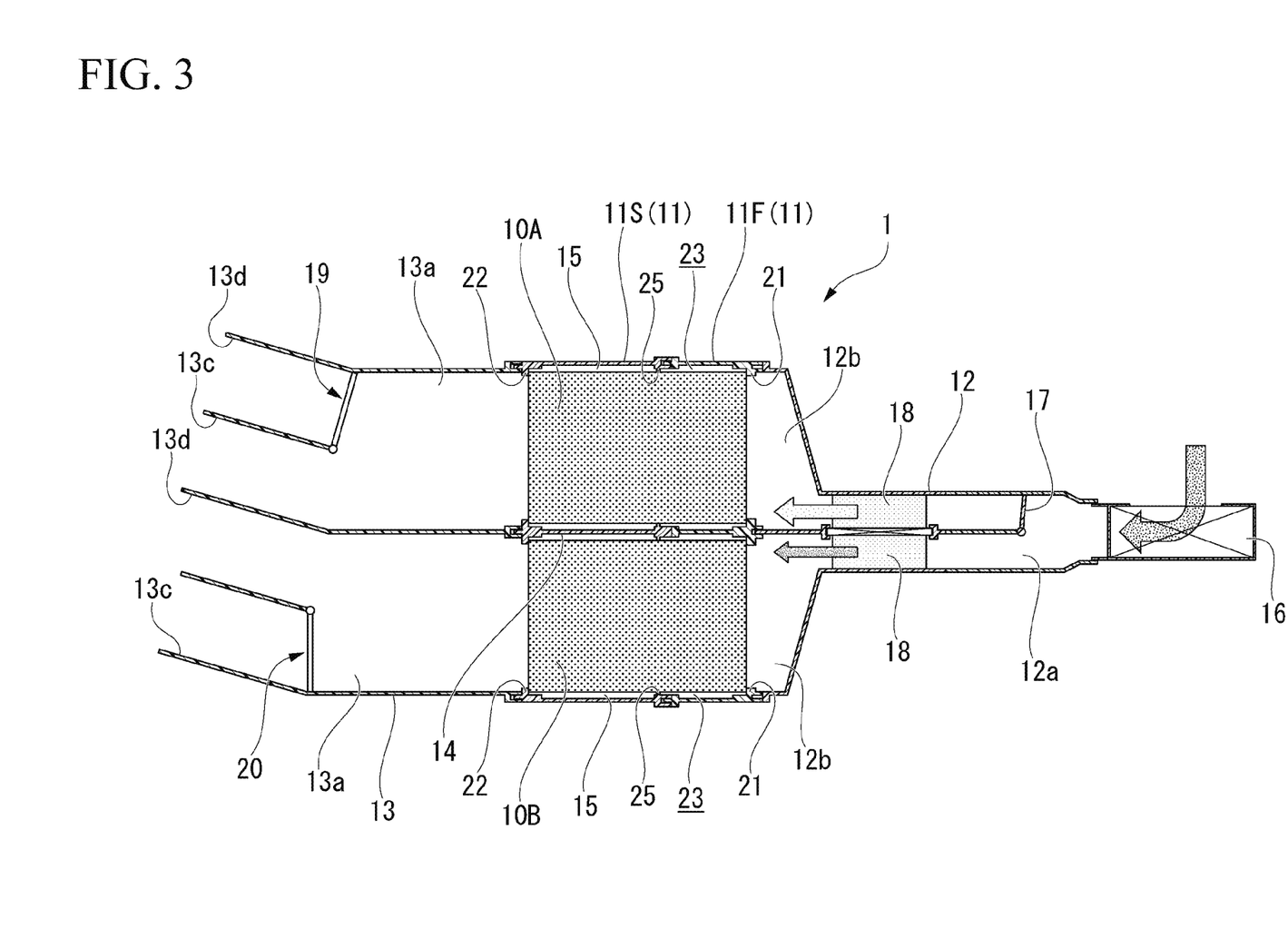
FIG. 3 is a schematic cross-sectional view of the air purification device of the embodiment of the present invention.

FIG. 1 is a perspective view of an air purification device 1 of the embodiment, and FIG. 2 is a partially cutout perspective view showing the air purification device 1 in FIG. 1, of which a substantially upper half section is cut out. In addition, FIG. 3 is a schematic cross-sectional view of the air purification device 1 showing an internal structure of the air purification device 1.

The air purification device 1 of the embodiment is a purification device configured to purify air in a passenger compartment of a vehicle, and at least carbon dioxide and water vapor in the passenger compartment can be removed. The air purification device 1 includes a pair of adsorption blocks 10A and 10B configured to cause air to circulate through the passenger compartment and adsorb purification target substances in air, a rectangular tubular housing 11 configured to accommodate the adsorption blocks 10A and 10B therein, an upstream-side duct block 12 for air introduction connected to one end side of the housing 11, and a downstream-side duct block 13 for air discharge connected to the other end side of the housing 11.

The adsorption blocks 10A and 10B each have an adsorbent layer, through which air can flow, disposed in a block case having a rectangular tubular shape. The adsorbent layer has a structure configured to support or in which can be impregnated an adsorbent such as zeolite or the like that can adsorb, for example, carbon dioxide, water vapor, volatile organic compounds (VOC), or the like, into a base material. In addition, the block case is formed of, for example, a resin material in a tubular shape, and allows circulation of the air in a direction along a tubular wall. The tubular wall of the block case has airtightness, and restricts leakage of the air in a direction crossing the flowing direction.

The housing 11 has a partition wall 14 formed therein in a flowing direction of the air. The partition wall 14 partitions the inside of the housing 11 into two accommodating chambers 15. The adsorption blocks 10A and 10B are disposed in the accommodating chambers 15 corresponding thereto, respectively. In addition, the housing 11 has a first housing 11F disposed upstream in the flowing direction of the air and a second housing 11S disposed downstream in the flowing direction of the air, and the first housing 11F and the second housing 11S are adhered to each other while end surfaces thereof abut each other.

A blowing fan 16 for internal air introduction is assembled to an end portion of the upstream-side duct block 12 on an upstream side. The blowing fan 16 introduces the air in the passenger compartment into the upstream-side duct block 12. The upstream-side duct block 12 has a common passage 12a into which air is introduced from the blowing fan 16, and two separate passages 12b branching off from the assembled passage 12a. The two divided passages 12b communicate with the adsorption blocks 10A and 10B corresponding to the inside of the housing 11. Accordingly, the air in the passenger compartment is introduced into the adsorption blocks 10A and 10B through the respective divided passages 12b corresponding thereto. An opening/closing door 17 configured to switch introduction of the air is provided on an end portion of the two divided passages 12b on the side of the assembled passage 12a. A heating device 18 configured to heat the air introduced into the passenger compartment is interposed into each of the divided passages 12b.

Either one of the heating devices 18 disposed in the two divided passages 12b is selectively heated. In the embodiment, one of the two divided passages 12b into which the air heated by the heating device 18 is introduced serves as an introduction port for heated air, and the other one of the two divided passages 12b into which non-heated air is introduced serves as an introduction port for indoor air. The introduction port for heated air and the introduction port for indoor air are appropriately switched between by an operation of the opening/closing door 17.

The downstream-side duct block 13 has two communication passages 13a in communication with the adsorption blocks 10A and 10B corresponding thereto in the housing 11, a return port 13c configured to return the purified air into the passenger compartment, and a discharge port 13d (a discharge port for used regeneration air) configured to discharge the air used for regeneration of the adsorption blocks 10A and 10B to the outside of the vehicle. The communication passages 13a can selectively allow communication with the return port 13c or the discharge port 13d via opening/closing doors 19 and 20 configured to switch a flow path.

Further, in FIG. 3, for the purpose of easy understanding of the passage structure, two return ports 13c and two discharge port 13d are drawn so that they are connected to the respective communication passages 13a for convenience.

The air purification device 1 can be switched between an air purification state in which indoor air is purified and a regeneration state in which the adsorption blocks 10A and 10B are regenerated according to switching operations of the opening/closing doors 17, 19 and 20.

Specifically, the air purification device 1 is in an air purification state in which indoor air is purified by causing the divided passage 12b (an introduction port for indoor air) on a side that is not heated by the heating device 18 and the return port 13c to come in communication with any one of the adsorption blocks 10A and 10B. In this state, when the air in the passenger compartment is introduced into any one of the adsorption blocks 10A and 10B, the purification target substances in the air are adsorbed by the adsorption block. Then, the air from which the purification target substances are removed by the adsorption block is returned into the passenger compartment through the return port 13c of the downstream-side duct block 13.

In addition, the air purification device 1 is in a regeneration state in which the adsorption block is regenerated by causing the divided passages 12b (the introduction port for heated air) on a side heated by the heating device 18 and the discharge port 13d to come into communication with any one of the adsorption blocks 10A and 10B. In this state, when any one of the adsorption blocks 10A and 10B is introduced after the air in the passenger compartment is heated by the heating device 18, the purification target substances adsorbed by the adsorption block are dispersed in the air. Then, the air in which the purification target substances are dispersed is discharged to the outside of the vehicle through the discharge port 13d of the downstream-side duct block 13.

Figure 4:
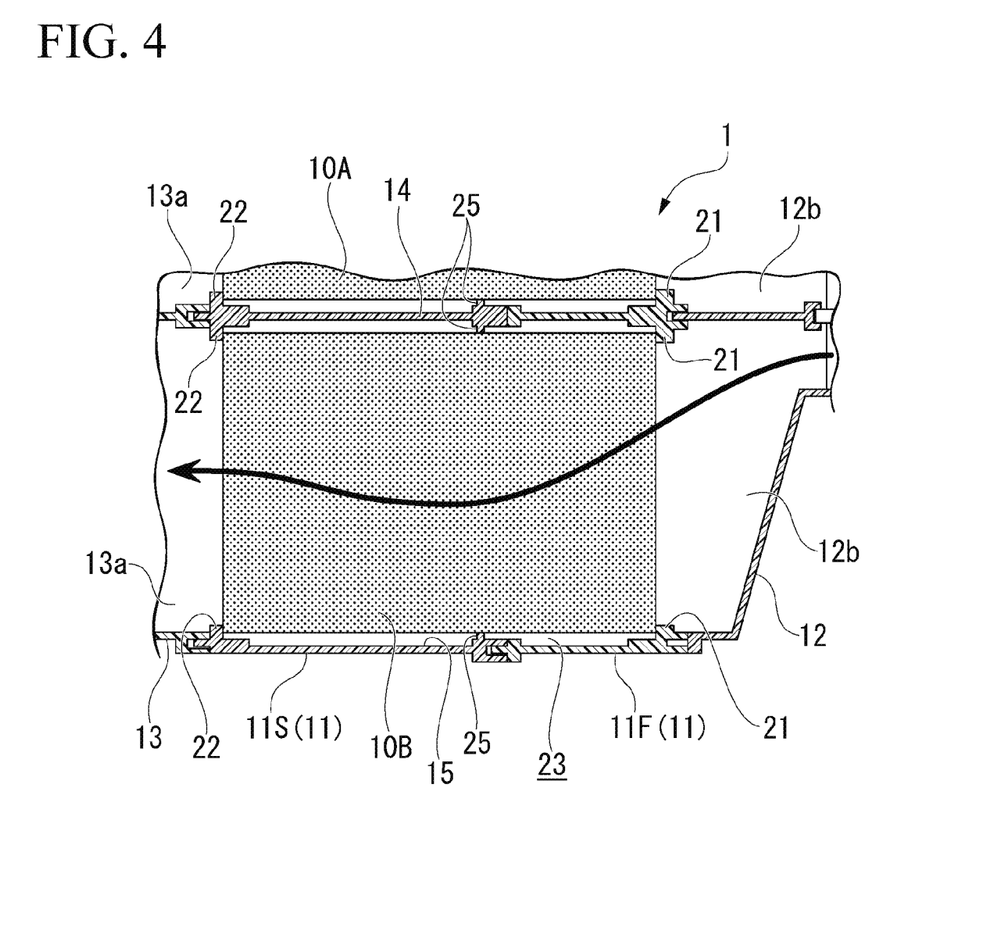
FIG. 4 is an enlarged cross-sectional view of the air purification device of the embodiment of the present invention.

FIG. 4 is an enlarged cross-sectional view showing an accommodating section of the adsorption blocks 10A and 10B of the air purification device 1.

As shown in FIG. 4, in the adsorption blocks 10A and 10B disposed in the accommodating chambers 15, a space between a circumferential edge of an air introduction-side end portion and the housing 11 is sealed by first seal sections 21, and a space between a circumferential edge of an air discharge-side end portion and the housing 11 is sealed by second seal sections 22. In the embodiment, the first seal sections 21 are formed by a flange protruding inward from the circumferential edge of the air introduction-side end portion of the housing 11. The first seal sections 21 are in close contact with air introduction-side end surfaces of outer circumferences of the adsorption blocks 10A and 10B. Similarly, the second seal sections 22 are formed by a flange protruding inward from the circumferential edge of the air discharge-side end portion of the housing 11. The second seal sections 22 are in close contact with the air discharge-side end surfaces of the outer circumferences of the adsorption blocks 10A and 10B.

In the embodiment, since the outer circumferential edge portions of the adsorption blocks 10A and 10B are in close contact with the first seal sections 21 and the second seal sections 22, a sealed hollow chamber 23 is formed between the housing 11 and the outer circumferential surfaces of the adsorption blocks 10A and 10B. In the embodiment, the hollow chamber 23 configures an insulating layer configured to block thermal conduction between the adsorption blocks 10A and 10B and the housing 11.

A plurality of support protrusions 25 having tip portions in contact with outer surfaces of the adsorption blocks 10A and 10B protrude at substantially intermediate positions between a protruding position of the first seal section 21 and a protruding position of the second seal section 22 in the inner surfaces of the accommodating chambers 15 of the housing 11. In the case of the embodiment, the tip portions of the support protrusions 25 are constituted by flat surfaces. The support protrusions 25 restrict displacement in a direction crossing the flowing direction of the air of the adsorption blocks 10A and 10B by coming in contact with the outer surfaces of the adsorption blocks 10A and 10B over a small area.

As described above, in the air purification device 1 of the embodiment, the hollow chamber 23 that forms the insulating layer is provided between the housing 11 and the outer surfaces of the adsorption blocks 10A and 10B. For this reason, during regeneration of the adsorption blocks 10A and 10B, heat transfer from the adsorption blocks 10A and 10B to the housing 11 is minimized by an insulating effect of the hollow chamber 23. Accordingly, heat from the adsorption blocks 10A and 10B heated by the heated air cannot be easily radiated to the outside through the housing 11. Accordingly, when the air purification device 1 of the embodiment is employed, during regeneration of the adsorption blocks 10A and 10B, the purification target substances from the adsorption blocks 10A and 10B can be efficiently dispersed.

In addition, in the air purification device 1 of the embodiment, the inside of the housing 11 is partitioned into the two accommodating chambers 15 by the partition wall 14, and the adsorption blocks 10A and 10B corresponding to the insides of the accommodating chambers are disposed, and the adsorption blocks 10A and 10B can be switched to an air purification state and a regeneration state according to operations of the opening/closing doors 17, 19 and 20. Then, in the case of the air purification device 1 of the embodiment, since the hollow chamber 23 that is an insulating layer also bridges between the adsorption blocks 10A and 10B and the partition wall 14, transfer of heat from the one adsorption block 10A (or 10B) to the other adsorption block 10B (or 10A) through the partition wall 14 can be minimized. For this reason, when air purification is performed by the other adsorption block 10B (or 10A), a decrease in efficiency of the air purification, which is caused by the heat transferred from the one adsorption block 10A (or 10B). can be prevented.

Further, in the embodiment, while the insulating layer between the housing 11 and the outer surfaces of the adsorption blocks 10A and 10B is constituted by the sealed hollow chamber 23, the insulating layer can also be constituted by an insulating member instead of the hollow structure. However, like the embodiment, when the insulating layer is constituted by the sealed hollow chamber 23, thermal expansion of the outer surfaces of the adsorption blocks 10A and 10B can be flexibly allowed by the hollow chamber 23 while a high insulating property can be obtained. Accordingly, when the configuration of the embodiment is employed, application of an unnecessary external force to the surroundings due to thermal expansion of the outer surfaces of the adsorption blocks 10A and 10B can be minimized.

In particular, in the air purification device 1 of the embodiment, the space between the circumferential edges of the air introduction-side end portions of the adsorption blocks 10A and 10B and the housing 11 is sealed by the first seal section 21, the space between the circumferential edges of the air discharge-side end portions of the adsorption blocks 10A and 10B and the housing 11 is sealed by the second seal section 22, and thus, the hollow chamber 23 is formed. In the case of the embodiment, the hollow chamber 23 can be constituted with an extremely simple configuration.

In addition, in the air purification device 1 of the embodiment, the support protrusions 25 in contact with the outer surfaces of the adsorption blocks 10A and 10B are provided on the inner surface of the housing 11 between the first seal section 21 and the second seal section 22. For this reason, displacement of the adsorption blocks 10A and 10B can be restricted by the support protrusions 25 while reducing thermal conduction from the adsorption blocks 10A and 10B to the housing 11 to a minimum level. Accordingly, when the air purification device 1 of the embodiment is employed, it is possible to minimize rattling of the adsorption blocks 10A and 10B in the housing 11 due to traveling vibrations or the like of the vehicle.

Next, another embodiment shown in FIG. 5 and FIG. 6 will be described. Further, since a basic configuration of the embodiment is substantially similar to the above-mentioned embodiment, components the same as those of the above-mentioned embodiment are designated by the same reference numerals and repeated description thereof will be omitted below.

Figure 5:
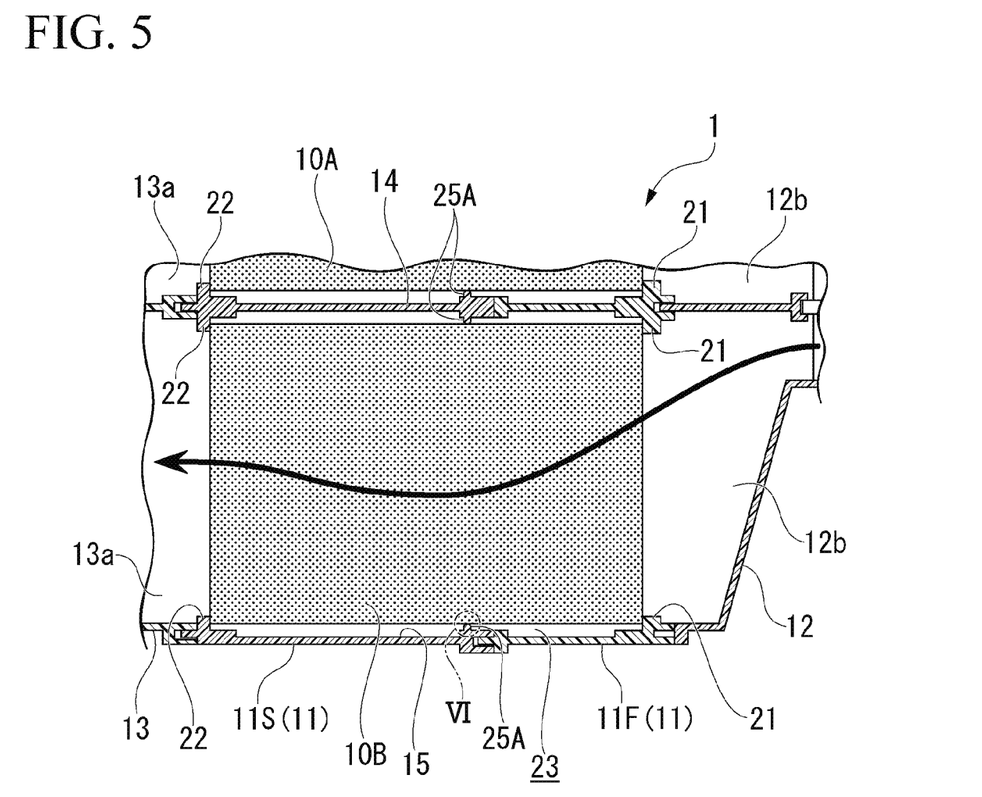
FIG. 5 is an enlarged cross-sectional view of an air purification device of another embodiment of the present invention.
Figure 6:
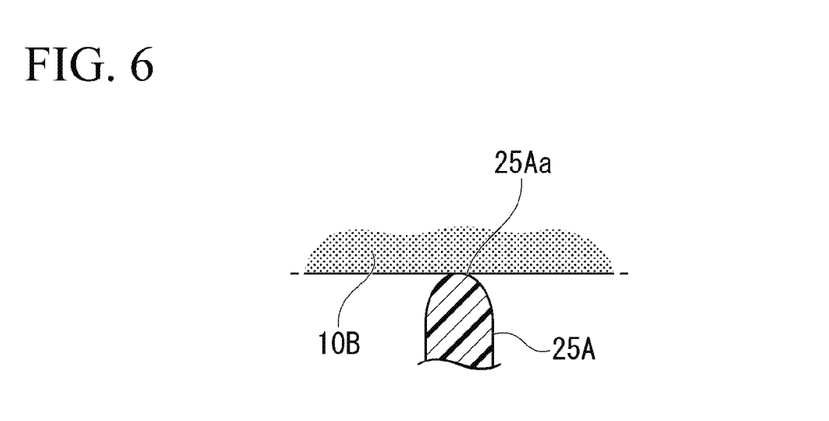
FIG. 6 is an enlarged view of a portion VI in FIG. 5 of the air purification device of the other embodiment of the present invention.

FIG. 5 is an enlarged cross-sectional view showing the accommodating sections of the adsorption blocks 10A and 10B of the air purification device 1, and FIG. 6 is a further enlarged view of a portion VI in FIG. 5.

The air purification device 1 of the embodiment is distinguished from the above-mentioned embodiment in a shape of each of tip portions of support protrusions 25A formed on the inner surface of the accommodating chambers 15 of the housing 11. That is, while the tip portions of the support protrusions 25 are constituted by flat surfaces in the above-mentioned embodiment, each of tip portions 25Aa of the support protrusions 25A of the embodiment is formed in a hemi-spherical shape.

In the air purification device 1 of the embodiment, since the tip portion 25Aa of the support protrusion 25A is formed in a hemi-spherical shape, thermal conduction from the adsorption blocks 10A and 10B to the housing 11 through the tip portions of the support protrusions 25A can be further reduced while securing sufficient support rigidity due to the support protrusions 25A.

Further, the present invention is not limited to the above-mentioned embodiments, and various design changes may be made without departing from the scope of the present invention. For example, while the above-mentioned air purification device 1 is a purification device configured to purify air in the passenger compartment of the vehicle, the air purification device according to the present invention is not limited to a vehicle and may be used in a building.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An air purification device comprising:
    an adsorption block configured to adsorb purification target substances in air by indoor air being circulated, and which is regenerated by dispersing the adsorbed purification target substances by circulating heated air;
    a housing configured to accommodate the adsorption block therein;
    an introduction port for indoor air and an introduction port for heated air provided on one end side of the housing; and
    a return port for indoor air and a discharge port for used regeneration air provided on the other end side of the housing,
    wherein the air purification device being switchable between an air purification state in which the introduction port for indoor air and the return port for indoor air are able to communicate with the adsorption block and a regeneration state in which the introduction port for heated air and the discharge port for used regeneration air are able to communicate with the adsorption block,
    an insulating layer is provided between the housing and the outer surface of the adsorption block,
    wherein the insulating layer is constituted by a hollow chamber provided to seal between the housing and the adsorption block, and
    wherein a space between a circumferential edge of an air introduction-side end portion of the adsorption block and the housing is sealed by a first seal section, and a space between a circumferential edge of an air discharge-side end portion the adsorption block and the housing is sealed by a second seal section.

2. The air purification device according to claim 1,
    wherein the housing comprises a partition wall configured to partition the inside thereof into a plurality of accommodating chambers,
    an adsorption block is disposed in each of the accommodating chambers, and
    the adsorption block in each of the accommodating chambers are made switchable between the air purification state and the regeneration state.

3. The air purification device according to claim 1, wherein a support protrusion disposed between the first seal section and the second seal section and in contact with the outer surface of the adsorption block is provided on the inner surface of the housing.

4. The air purification device according to claim 3, wherein a tip of the support protrusion is formed in a hemi-spherical shape.

* * * * *